United States Patent [19]
Chun

[11] Patent Number: 5,814,214
[45] Date of Patent: Sep. 29, 1998

[54] ELECTRONICALLY DETECTABLE COMPOUND OIL FILTER AND ITS DEVICE

[76] Inventor: Myung Woo Chun, No. 604 Shibuya Sanshin Mansion, 29-33, Sakuraoka-Cho, Shibuya-ku, 150, Tokyo, Japan

[21] Appl. No.: 496,910

[22] Filed: Jun. 29, 1995

[51] Int. Cl.[6] .................................................. B01D 35/147
[52] U.S. Cl. ..................... 210/130; 123/196 A; 210/168; 210/416.5; 210/433.1; 210/497.01
[58] Field of Search ........................ 184/6.24; 123/196 A; 210/85, 90, 130–133, 168, 416.5, 433.1, 434, 440, 443, DIG. 17, 497.1, 497.01; 60/396

[56] References Cited

U.S. PATENT DOCUMENTS

| | | | |
|---|---|---|---|
| 3,726,403 | 4/1973 | Shaltis | 210/440 |
| 4,655,938 | 4/1987 | Fragola | 210/416.5 |
| 4,695,377 | 9/1987 | Medley | 210/440 |
| 4,885,082 | 12/1989 | Cantoni | 210/440 |
| 5,484,523 | 1/1996 | Bjornsson | 210/130 |
| 5,558,058 | 9/1996 | Ming et al. | 123/196 A |

FOREIGN PATENT DOCUMENTS

| | | | |
|---|---|---|---|
| 344768 | 3/1931 | United Kingdom | 210/168 |

*Primary Examiner*—Joseph W. Drodge
*Attorney, Agent, or Firm*—Foley & Lardner

[57] ABSTRACT

A new type of semi-permanently usable oil filter controls the production of air bubbles, a cause of oil combustion, through a successful blending of oil filter and electronic control device by comprising a sensor means which senses the temperature, air bubbles and pressure of oil expelled from a pump in particular and the number of revolutions of an engine. A microcomputer which inputs data such as the dynamic rising pressure and falling-type stop pressure of uncompressed oil and data compared with the amount of oil passing under the pressure in the circulatory system according to the fuzzy theory. The computer compares the data of the sensor means and the peculiarity of Soliton wave based on the fuzzy theory. An actuator means is provided equipped with plural valves and plural relays which open/close the valves according to output from the microcomputer. Plural filters are installed so as to be opposed to the valves.

8 Claims, 4 Drawing Sheets

ELECTRONICALLY DETECTABLE COMPOUND OIL FILTER AND ITS DEVICE

DETAILED DESCRIPTION OF THE INVENTION

Figure 1:
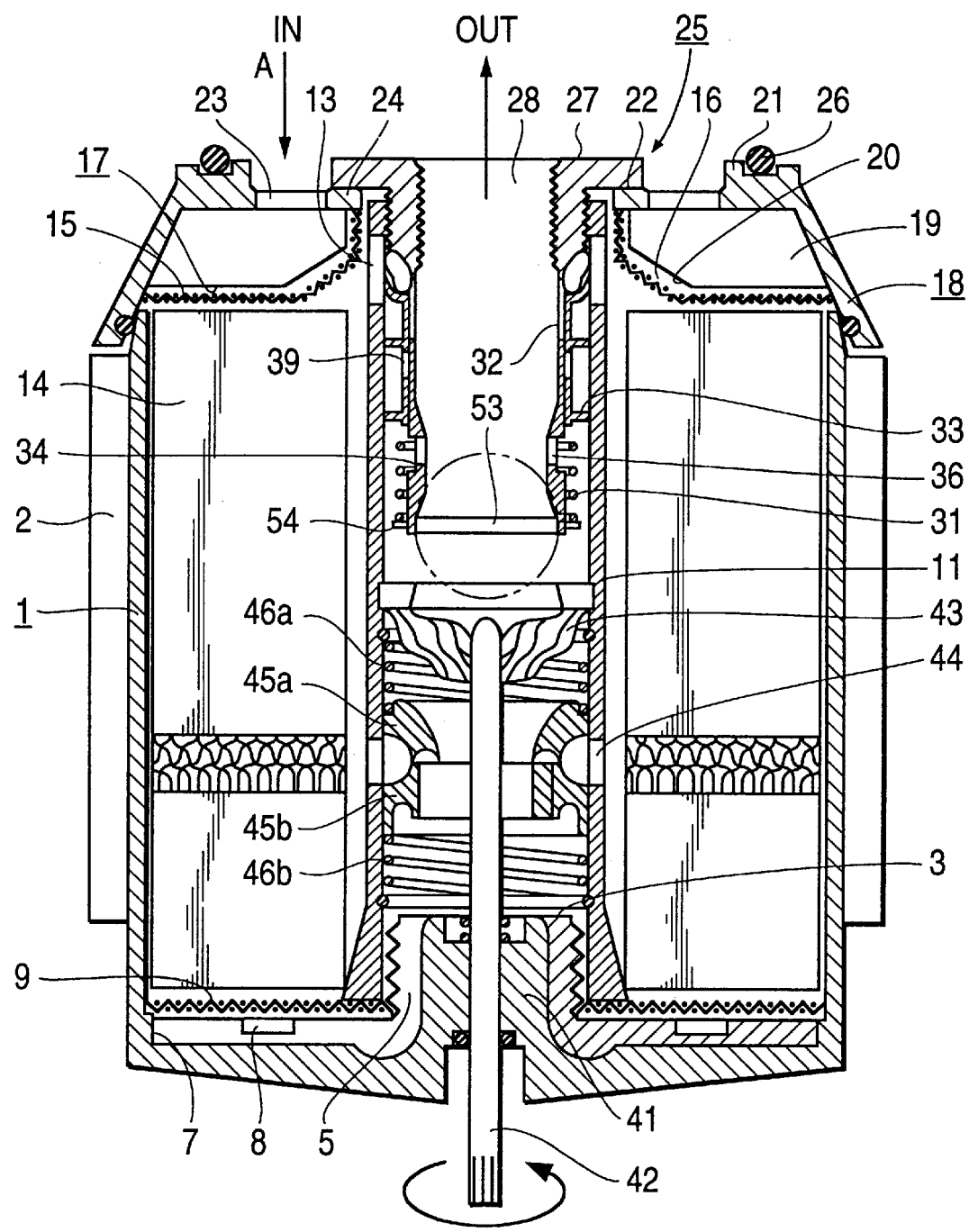
FIG. 1 is a distribution diagram of the present invention.

The present invention relates to an oil filtering device. Particularly, the invention relates to an electronically detectable compound oil filter and its device. To be more particular, the present invention relates to an electronically detectable compound oil filter and its device, which is an environmental protection-type filtering actuator system serving both as producing the Soliton wave effect and a rotary power source which maintains stabilized oil pressure and prevents oil combustion and resultant pollution by reducing air bubbles in lubricating oil on the combined basis of hydrodynamic Soliton wave effect and fuzzy theory.

Economic and environmental concerns should be supplemented by each other. In the industrial field, there is a need for a new filtering system meeting environmental policies designed not only to reduce particle emissions in a muffler but also to prevent carbon dioxide ($CO_2$) production by preventing oil combustion in an internal combustion engine. This save resources and energy by decreasing waste as much as possible.

Also needed are a system and a device which make it possible to discontinue using a previous filter only once and then throwing it away. This improves our living environment by preventing industrial products from being a source of pollution and promotes energy-saving by replacing disposable articles with those which promote efficiency and are non-waste products.

An oversupply of oil in all industrial machines and internal combustion engines contributes to producing air bubbles by fluctuating pressure in engines and to producing carbon dioxide by the combustion of oil.

However, the present invention is a device equipped with an environmental protection-type oil filter design to prevent any contribution to the problem of global warming by controlling the production of air bubbles to effect a substantial decrease of carbon dioxide.

The device decreases mechanical loss, such as friction and wear, by facilitating the circulation of oil in the circulatory system of an industrial machine or an internal combustion engine. Functionally, it extends and quickens the operational radius of a hydraulic machine. In addition, it improves a cooling effect, thereby extending the life of an industrial machine.

Oil is a disposable substance. The oil filter is also a disposable article. Since these articles are disposable, they are thrown away after use.

The pleated paper-type oil filter which is in general use is not an oil filter which structurally accommodates pollutants, the pollutants flow out to the engine again and pollute oil when a by-pass opens and closes, and are mixed by being restored to polluted oil.

Moreover, the by-pass valve of this system is subject to heavy fluctuations in pressure so extreme that air bubbles are plentifully formed, thereby causing the rate of oil combustion to be high and carbon dioxide to be produced in large quantities. Further, the filtering area is structurally small and the cycle of oil change is so short that it forms a source of industrial wastes and oil pollution. The conventional filter is choked in a short space of time, and so it is necessary to change it. Being a disposable filter, it contributes to the problem of pollution.

Up to present, no alternative has been found to the practice of regularly changing oil and the oil filter to maintain an internal combustion engine.

In addition, oil is not satisfactorily supplied by conventional oil filters for the reason that production of air bubbles, due to a sudden change in oil pressure caused by driving conditions such as engine starting, cold starting, acceleration and stopping, is a burden on the inhalation load of an oil pump and the burden is quickly communicated to the lubricating system in proportion to a rise in the number of engine revolutions. This problem is not solved in the structure of pleated paper-type oil filter.

The present invention solves these problems and protects the environment by providing an oil filter with an extended life cycle. By switching in a full flow filter from the Shunt filtering method to the Depth filtering method the function of a filter is improved and its life extended. This requires a change in the structure of the existing oil filter used for a long period of time.

The present invention aims at changing the concept of the oil filter to a filter used for a long period of time. It makes it possible to recycle used oil and makes it unnecessary to throw used oil away or dispose of it as a waste product. It also makes it possible to keep oil from becoming polluted.

Accordingly, the present invention is to provide a filter (the same as the filter which removes microorganism by eliminating those viruses which are smaller than 0.02 micron in ecology) which can perform a highly precise filtration of those particles smaller than a micron through filter paper of high density which has not been known heretofore.

The product of the present invention decreases polluted oil and the quantity of waste matter. It does not discharge waste oil substantially, and so it improves the structure of an oil filter. In the present invention, Pascal's law and the orifice theory including the hydraulic theory and Bernoulli theorem are of help to the function of an oil filter. When the oil filter operates, the compressed pulse of a Soliton wave quickens the velocity of filtration at an accelerating pace.

On the other hand, the present invention improves the capability of catching impurities by promoting the filtering capacity of a depth-type oil filter.

The operational relationship between a gear oil pump and an oil filter in a lubrication system is subject to driving conditions and mechanical driving forces which do not always allow an oil flow with the constant oil pressure necessary to a proper flow of oil in the lubrication system.

The present invention is a device equipped with a filter harmonized with the flow of a liquid by inferring from the fuzzy theory the driving conditions, mechanical operation conditions and the flowing conditions of an uncompressed liquid according to fluctuations in oil pressure and in the amount of oil and by selecting a proper filter according to an electronic signal.

The present invention relates to an oil filter and its device which aim at enabling oil to circulate at a high speed without meeting with resistance from the oil filter for quick supply and circulation of oil when necessary and to keep an engine from damage in the initial starting stage.

The present invention aims at turning from the conventional pleated paper-type lateral Shunt filtering method to the dense vertical depth filtering method.

Regarding the filter paper of the present invention, large and small holes made vertically are formed on its plain filtering surface and arranged in parallel by alternating the upper and lower parts thereof and it is wound into a roll. Up to this time, particles and dirt have been caught by forcibly sending a flow at an angle of 90° to the surface of the filter paper. In the present invention, however, the flow is not intercepted 100% but the flowing is freely linked with pulsation, so that the flow maintains compressed pulses without-spreading. By applying the Soliton wave theory, a property and a condition which are proper to the flow are selected and mechanical functions are thereby infallibly conformed to the peculiarity of an uncompressed liquid for the amount of driving operations, so that the flow quickens and oil combustion is thereby controlled to the utmost.

The present invention is constructed so as to have the effect of controlling the cause of producing carbon dioxide and the production of particles by the prevention of combustion without causing air bubbles to be produced by a high-speed back flow in the oil circulatory system.

The present invention operates its system in combination with a proper filtering device through the control of an actuator by converting the quantity of movements into electric signals through an air bubble sensor, a temperature sensor and a pressure sensor (piezo-type) for the purpose of removing the hammer pressure of a fluid in the oil circulatory system produced in connection with the driving operations.

Figure 2:
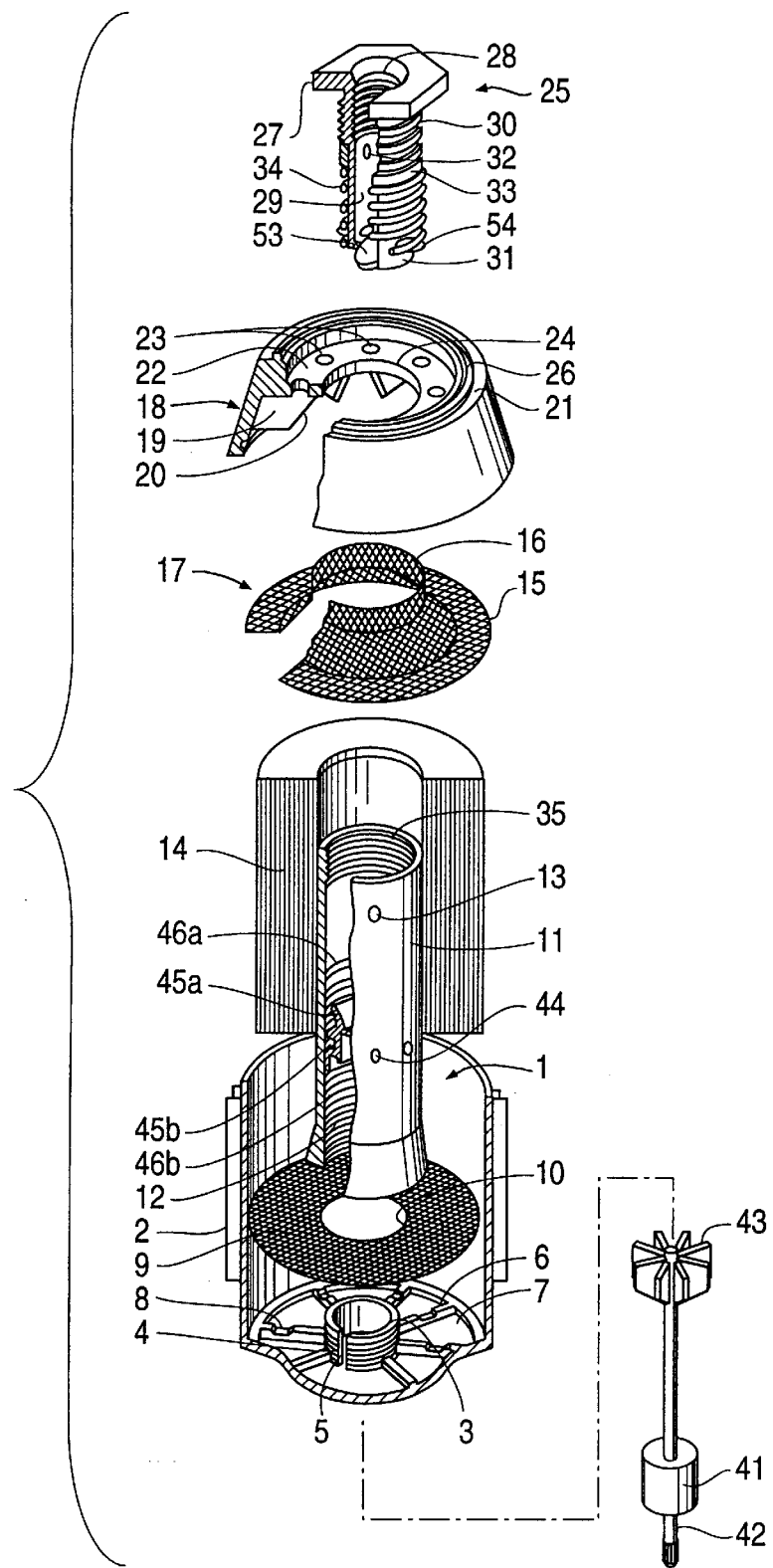
FIG. 2 is a cross-sectional view of an oil filter according to the present invention.
Figure 3:
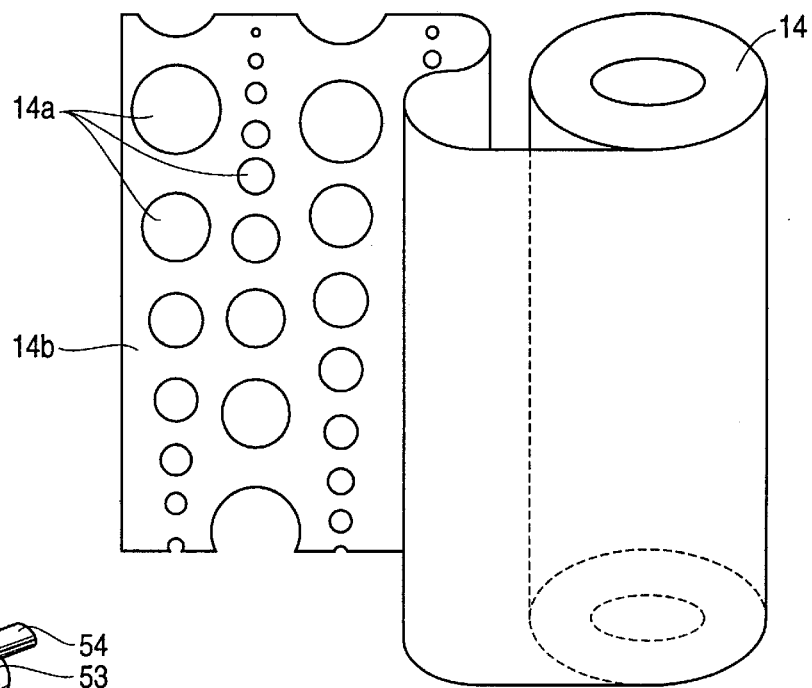
FIG. 3 is a perspective view of filter paper according to the present invention.

It is the that when an engine starts or makes a cold start, the engine is worn or damaged up to 80%. The existing oil filter is unable to secure a sufficient amount of flow instantaneously due to its structural defects. When the present invention is used, it is possible not only to secure a sufficient amount of flow instantaneously in the initial starting stage but also to absorb the initial hammer pressure, and so penetration into the dense filter paper is also quick. In the present invention, the foregoing problem can be solved by sliding valves 45a, 45b as shown in FIG. 2. This part is called the primary filtering sector.

The filter and its device are controlled by operating the actuator which selects a required filter with an electric signal by figuring out the range of fluctuations in oil pressure and the coefficients of resistance made by dynamic rising pressure (pressure rising due to a rise in RPM) and falling-type stop pressure (Pressure moving to low pressure from rising peak pressure) in the circulatory system and programming its relationship with the amount of driving operations in a microcomputer according to the fuzzy theory.

A power generation means which uses the force pressure of oil in the circulatory system is installed within the oil filter. An apparatus which swings the propeller 43 is attached on to the driving shaft 42 and a more plentiful amount of filtered oil is obtained by the pressure of oil in the system and force of the oil expelled from the filter.

The means is an electronically detectable compound oil filter and its device, which produces a multiplication effect on the cooling of oil by acceleration by employing a filtering means with large and small holes arranged vertically in highly absorbable grepe filter paper as shown in FIG. 2 which is wound on the outer side of an inner case, which is a central cylindrical pipe, like a roll of paper.

This filtering technique restores pulsation to the true nature of a fluid and the amount of passing oil is intercepted 100 %. By application of the liquid theory under the Soliton wave effect, in order maintain some designated constant pulsation pressure at all times, a mechanism having sliding valves is installed to make it possible to maintain the Soliton waves by using as an actuator means the consecutive structure which enables high-speed reflective pulses to spread by controlling resistance to the utmost and without reducing the waveform of a flow. This promotes filtering capacity by not forcibly intercepting 100 % of oil the flow for filtration as in the past, but by restoring compressed pulsation which powerfully pulsates in the flow partially and produces the Soliton wave effect consecutively and accelerates the flow with the maximum control of structural resistance and without destroying the pressure waveform in the circulatory system, thereby making a more plentiful amount of flowing oil and pollutants pass therethrough.

It is well known that carbon monoxide is reducible for prevention of oil combustion in an internal combustion engine. This is ascribable to the production of air bubbles in the circulatory system and oil can be kept from burning by controlling the production of air bubbles.

The present invention makes a drastic change in the concept of the filter and by-pass on the basis of Soliton wave control technology by applying thereto the hydraulic engineering theory, Pascal's law, Bernoulli theorem, orifice principles and Soliton wave effects blending the flow of an oil filter in both hydraulic engineering theory and mechanical operation and making physical properties of a fluid and mechanical operation produce the Soliton wave effect together for the purpose of solving the difficult problem of passing through a depth filter in order to secure a sufficient amount of flowing oil in the depth filtering method.

The means is an electronically detectable compound oil filter and its device, which prevent oil from burning by enabling, it to flow quantitatively as well as qualitatively without producing air bubbles in the circulatory system of an engine maintaining the waveform with the mechanical primary and secondary by-pass means and actuator means and by adopting the fundamental science theory in the oil filter.

Since a fluid in the oil circulatory system of an internal combustion engine is not compressed, it becomes a factor in producing air bubbles by the production of instantaneously irregular hammer pressure and impact changing pressure particularly between a gear pump and a filter. Thus, it is necessary to absorb such physical shock.

In order to maintain constant oil pressure, therefore, one or more sensor means are installed, momentary hammer pressure and shocking fluctuating pressure which are produced by a sudden change in flow are sensed, and production of air bubbles is controlled with a quick response to maintain the pulsation of a quick flow by converting the impact of oil pressure into electric signals uniting a pressure sensor and an air bubble sensor through a piezoelectric effect.

On the other hand, the flow is made not to disperse by enabling the reflection of the Soliton wave to be maintained continuously, oil is thereby made to maintain the force of inertia without coming to a stop through the stabilization of oil pressure. A proper filter is selected at a high speed from among those filters which are linked with each flow by the continuation of the reflected pulse (Soliton wave effect). The pulse is accelerating due to a fixed end in the same device and through the relays and slide valves of an actuator means. The filter can be sensitive to dynamic rising oil pressure and falling-type stop pressure and can adapt with a quick response, so that it is possible to enable oil to flow quantitatively as well as qualitatively without allowing a gap in its flow at any time. Therefore, the present invention is an electronically detectable compound oil filter and its device structured so as to obtain stabilized oil pressure and a stabilized amount of flowing oil.

In that part of the system which meets with the most resistance by linking with the axis of revolution in the oil circulatory system, a viscous fluid flows forms its waveform by being divided into dynamic rising pressure and falling-type stop pressure. In order to maintain the compressed pulse of the resulting Soliton wave, which pulsation is highly durable and non-dispersive, dynamic rising pressure and the value of resistance when the amount of flowing oil increases are determined by clearly sensing the oil pressure displayed during the flow of oil in terms of the pressure and waveform of a liquid. The falling value of falling type stop pressure and a comparison therewith are figured out by the fuzzy theory. The fluctuating pressure is made appropriate for the optimum amount of flowing oil through the control of a programmed microcomputer (because excessive flow forms a cause of air bubbles. Moreover, it is an obstacle to the formation of an oil film).

The present invention is a device wherein continuation between the amount of flowing oil and oil pressure is adjusted to filtering conditions (conditions of oil pressure applied to filters) required for many interchangeable filters and substitution conversion operation among them is made possible by interpreting and programming various fluctuating pressures produced by the amount of its own appropriate mechanical operations in the set theory of fuzzy/crisp and selecting a conditional filter under always proper electronic signal instructions separately from the driving means as the means of converting unbreakable pulsation proper to a fluid into a compressed pulse and enabling it to continue for a long while in order to utilize the Soliton wave effect.

In order to make oil flow quantitatively as well as qualitatively so as not to produce air bubbles for continuation of the Soliton effect, a fixed end is structurally installed and a compressed pulse is made to continue for the production of an optimum Soliton wave effect in fuzzy theory by collectively interpreting various forms of flow.

As the method of controlling air bubbles by an actuator means, relays and sliding valves are inserted under the control of electronic signal instructions of the fuzzy theory programmed in the microcomputer. A required filter is selected from among many filters at a high speed constantly. Therefore, the present invention is an electronically detectable compound oil filter and its system which make it possible to prevent oil from burning and reduce the production of $CO_2$ by a Soliton waveform flow which is not dispersed nor interfered with.

When an engine starts, filtering performance and resistance have a physical principle incompatible with each other. As a momentary shortage of oil supply at this time contributes a great deal to damaging the engine, a filter is requires the construction of which is based on the following new conception to solve various problems in the circulatory system. The construction of an accelerating filter is a two-dimensional system. Firstly, the penetration power of oil going to a filter net is made to accelerate by installing a primary by-pass means in order to make highly accelerating rapid circulation flow in from the outside.

Moreover, proper operations are conducted by the displacement of sliding valves of the primary by-pass means according to internal resistance which is met with due to a back flow of oil expelled from the main orifice. The present invention is therefore an electronically detectable compound oil filter and its system which are also linked with a rise in the number of revolutions and temperature of the engine by using a form memory alloy which sensitively increases and decreases the tension of springs according to need.

The present invention is an electronically detectable compound oil filter and its system constructed so as to enable stable oil pressure and the amount of filtered oil to flow out sufficiently by sensitively operating even under very small pressure through passive mechanical functions according to oil pressure by installing a damper 53 at an angle of 90° to a flow in order to maintain the stabilization of fluctuating force pressure through a multiple and multi-stage filter from the low-speed revolution sector suddenly to the high-speed revolution sector for sensitive response.

The present invention is an electronically detectable compound oil filter and its device which install a driving shaft 42 which doubles as a propeller 43 causing a flow in parallel with it, increases the amount of expelled oil twofold by applying the force of rotary inertia brought by the flow. The diving shaft is equipped with a mechanical power generation means which generates the rotary driving force by oil pressure.

As to the speed of flowing oil in FIG. 2, the oil which passes through the secondary by-pass holes 13 of an inner case 12 due to partial resistance made when it passes through a filtering means 14 pushes a slide valve 32 down. At this time, the speed of flowing oil is changed into pressure by the force which pushes the slide valve 32 down. At the same time, flowing force flows through the sectional area of the secondary by-pass holes 13 and the flowing becomes so slow that the amount of oil flowing to the by-pass is reduced. On the other hand, the pressure increased by pressurization gives pressure to the filtering means 14 and passes therethrough at all times. The pressure applied to the slide valve 32 in the inside of a tightly closed filter 10 is uniformly increased to the whole surface of the wall of a container to the extent of applied pressure. (Pascal's law)

Oil flowing through the sectional area and the upper end of the filtering means 14 is several tens of times as large as the sectional area of the by-pass opening 36 of the slide valve 32. Accordingly, the amount of flowing oil is larger even when resistance is made by the filtering means 14 (a coefficient of resistance 0.3), and so the amount of oil expelled to the side of main orifice 5 becomes large.

With speed becoming high, uniform pressure frequency of the secondary by-pass holes 13 and by-pass opening 39 of the inner case 12 becomes more, so that the slide valve 32 is opened a little and the amount of flowing oil is thereby limited.

Pressure under a given condition is proportionate to the amount of flowing oil, and so it rises by being pressurized to high pressure. In the main orifice 5, however, when pressure on the side of high pressure flows to the side of low pressure, the amount of oil flows by the square of the speed of flowing oil ($Q=V^2$), and so oil flows in large quantities.

Consequently, the amount of oil is reduced instantaneously and high pressure is changed into speed at the bottom of filtering means 14, so that a decompression effect (suction force) is produced and the speed of flowing oil (suction speed) becomes fast. In other words, oil from the side of main orifice 5 at the bottom of filtering means 14 is expelled and circulated quantitatively.

The theory that a fluid can be made to pass through a highly dense filtering means vertically by means of mechanical transmission according to oil pressure is based on the application of applied fundamental science theory to hydraulic engineering.

The sectional area of the entire circumference of a tissue element, which is a filtering means 14, is several tens of times as large as the entire sectional area of by-pass passage 44 in sectional area of flow if a coefficient of resistance 0.3 is deducted, and so the amount of flowing oil becomes large at the bottom of filtering means 14 and pressure of main orifice 5 becomes high.

Figure 4:
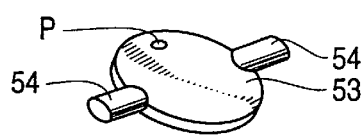
FIG. 4 is a cross-sectional view taken along the A—A line of FIG. 2.

The oil which flows to the low pressure side from the high pressure side according to the orifice theory flows at a speed of $V^2$, so that, as shown in FIG. 4, oil is instantaneously expelled in a high pressure condition and runs out rapidly through the main orifice 5, and with oil flowing to the side of a base valve 45 at a speed of $V^2$, pressure is reduced and a decompression effect is produced at the bottom of the tissue element(filtering means) 14. Consequently, the filtering means absorbs oil like sucking in quickly and oil passes therethrough so easily that it is possible to pass oil through the filtering means more plentifully. This part is called the third-stage main filtering sector.

Figure 5:
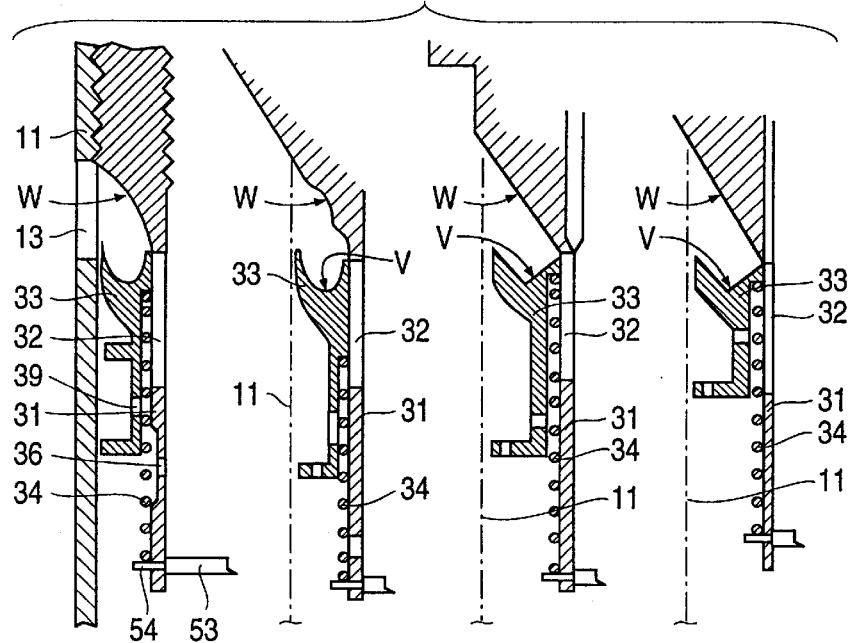
FIG. 5 is an operational diagram of a secondary by-pass means according to the present invention.
Figure 6:
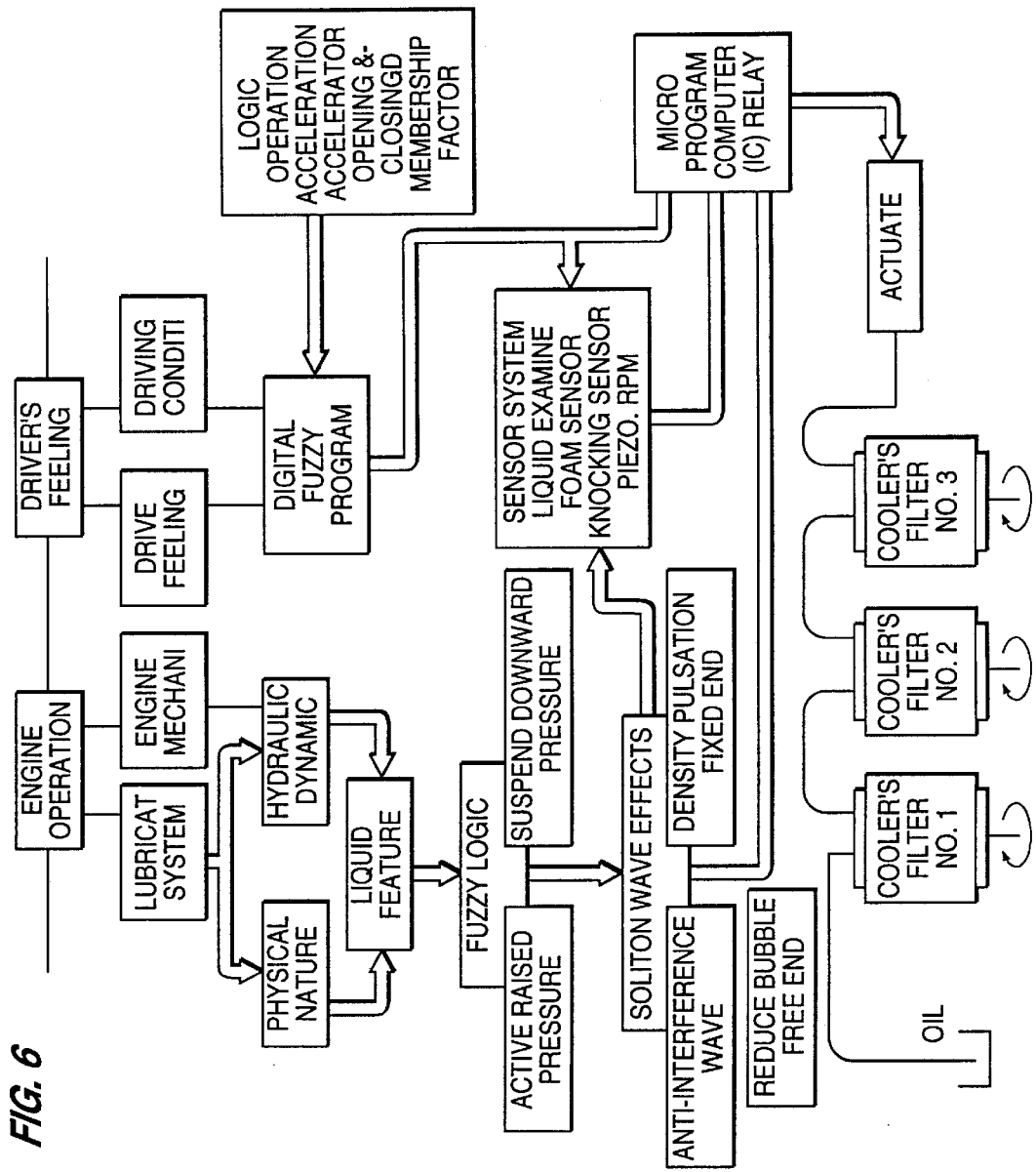
FIG. 6 is a conceptional diagram showing a source of idea for the present invention.

On the other hand, as shown in FIG. 5, the internal pressure of slide valve 32 and base valve 45 increases frequency of dynamic pressure by making conditions for operation (uniform pressure) and the slide valve 32 is thereby operated at an accelerating pace, so that up-and-down movement of the slide valve 32, namely, the radius of a stroke of the piston becomes small in inverse proportion to a distance on the contrary. Thus, the amount of oil flowing out to the base valve 45 becomes small. This part is called the piston-type second-stage high-speed filtering sector. And, in order to remove inertial pressurization, uniform pressure is formed at an accelerating pace by causing the slide valve 32 and a by-pass opening 36 to lose pressure sensitively and the frequency of the up-and-down movement of the slide valve 32 is thereby increased. Accordingly, the force which presses the slide valve 32 (the force applied to one point is by Pascal's law) increases pressure to the extent of the force applied to the surface of filtering means 14 and a pressurized condition is thereby formed at all times.

Oil pressure under a given condition is so proportional to the amount of oil that high hammer pressure is instantaneously produced by driving conditions in a by-pass passage 13 which is an oil flow passage and spray-type high pressure is produced in the main orifice 5. In other words, the amount of oil expelled from the high pressure side (of the main orifice 5) produces a decompression effect (suction force) by flowing to the by-pass opening 36 of the slide valve 32 (the low pressure side), and so it has been recognized as a difficult problem until now to secure the amount of oil by deeply passing it through the highly dense filtering means 15 (tissue element), but it is now possible to pass the correct amount of oil.

Therefore, opening/closing of the piston-type slide valve 32 has nothing to do with a rise in oil pressure. The moving range of the slide valve 32 by uniform pressure is inversely proportional to time. Thus, the moving distance of the reciprocating valve becomes so short that it is controlled by a cycle time and uniform pressure is produced.

Thus, the opening range of the slide valve 32 in proportion to an increase in the number of revolutions becomes gradually small and more frequent, and so it operates in a vibrating condition and it is not opened contrariwise.

When a sudden start is made or the number of engine revolutions increases (idling), the flow of oil produces hammer pressure instantaneously. This contributes in producing air bubbles. A turbulent flow is thereby caused and it is necessary to prevent it.

The flow of oil can be rectified by preventing the loosening and dispersing flow with a damper 53 interposed in the oil filter. Moreover, the slide valves 45a, 45b of a primary by-pass means which communicates with the by-pass passage 44 are installed and, when instantaneous hammer pressure is produced in the initial stage, it can be accommodated by quickly opening those slide valves 45a, 45b so that it is neutralized into stabilized oil pressure by the removal of dynamic pressure. This is called the first stage filtering sector.

The amount of oil and the oil pressure which pass through the main orifice 5 at the bottom of the filtering means 14 push the slide valves 45a, 45b. The oil pressure and resistance which are applied to the sectional area of circumference becomes $Q+Q'+X \geqq Y$, so that those valves 45a, 45b are pushed against the bias of a coefficient of form memory alloy springs 46a, 46b and slide in an oil expelling direction losing their opening/closing functions.

On the other hand, the temperature of oil goes down by the adjustment of a form memory alloy spring 34 under general running conditions, and so the damper 53 operates easily and removes early idling and hammer pressure, thereby rapidly promoting penetration of oil into the highly dense filtering means 14.

Accordingly, the operation range of the slide valve 32 of secondary by-pass means 13 is the second stage high-speed filtering sector. Whether an automobile runs at the fixed number of revolutions at a constant speed or at a higher speed, by the operation of the slide valves 45a, 45b fluctuating pressure is not produced.

The slide valves 45a, 45b reduce engine damage caused not only by hammer pressure produced when the engine makes a start or a cold start but also by an increase in the number of engine revolutions for instantaneous lack of oil.

In proportion to an instantaneous increase in the number of revolutions when the engine starts, expelled oil produces plenty of air bubbles instantaneously due to differential pressure in the structure of the conventional oil filter, and therefore quantitative oil circulation cannot be expected. Hence, in the case where high oil pressure or instantaneous hammer pressure is produced, in the present invention a speed sensor 71, a temperature sensor 72, an air bubble sensor 73 and a pressure sensor 74 detect it instantaneously and operate an actuator-means 90 by mechanical or electronic control for proper operation of plural filters 10, 10', 10".

A microcomputer 80 aims at securing the amount of oil by inputting a coefficient of fluctuations in oil pressure of filter structure and flow which have the Soliton wave effect, preparing a fuzzy operation program and circulating the rhythm of flow caused by the membership factor of the amount of oil fluctuating in pressure and the production of air bubbles without hindrance and at a high speed in the lubricating system according to mechanical functions, fluctuations in oil pressure and in the amount of oil and operating temperature by driving conditions.

The actuator means 90 is equipped with plural valves which are direction-changing valves operating at a high speed under instructions from the microcomputer 80. These valves 91, 91', 91" operate plural filters 10, 10', 10" so as to operate with a quick response. Each filter provides the best driving conditions for circulation of oil by removing air bubbles and stabilizing oil pressure pulsation according to running conditions and fluctuations in the flow of the lubricating system by quantitative as well as qualitative supply thereof using form memory alloy springs 46a, 46b which change filtering resistance and tension of the slide valves 45a, 45b.

To obtain a power generation means 40, a high-pressure flow which flows in the main orifice 5 passing through the filtering means 14 is utilized. In other words, the oil which passes through the main orifice 5 and exits in a spray condition becomes a power source for rotating a propeller 43 and a drive shaft 42 connected therewith.

It is known that attrition of an engine amounts to 80% when it starts. Therefore, it is most desirable that oil circulates at a high speed at all times without meeting with the oil filter resistance by using the centrifugal force of the propeller 43.

When the number of engine revolutions increases, the amount of oil expelled from an oil pump is not supplied as required due to a clog in the filter or air bubbles. For that reason, it is necessary to change the role of an oil filter more functionally in the structure of an engine.

Accordingly, the oil filter in the circulatory system should be a apparatus of the circulatory system which can conduct proper mechanical operations for a quick response so as to correspond to circulatory force pressure which is supplied by the oil pump at all times.

It is considered to be a most ideal method that the slide valves 45a, 45b are actuated by deeply guiding the pulsation of a flow for the purpose of structurally quickening its circulation in order to improve the rate of penetration of a flow into the highly dense depth filtering means 14 and oil is made to flow back by instantaneously quickly absorbing the hammer pressure produced when a sudden start is made. This is the first stage filtering sector.

In the oil filter 10, entry is made into the second stage high-speed filtering sector by quickening the motion cycle under uniform pressure of slide valves 45a, 45b and, at the same time, terminating the sliding of slide valve 32 and a more plentiful amount of oil is secured for promotion of filtering capacity by terminating hammer pressure and preventing the dispersing of a flow (a turbulent flow) or the damping of a flow.

The response of engine operation is prompted by quickening immediate compliance through improvement of mechanical functions in connection with the filter.

In the concept of the filtration up to now, the best filtering effect in the principle where the amount of filtered oil and filtering resistance are contrary to each other is to secure a more plentiful amount of passing oil before everything else. Therefore, the present invention changes the concept toward attaching importance to the speed of flowing oil.

Like using multi-grade oil to properly cope with a change in the temperature of engine oil, an oil filter is not exceptional, either. A mechanism is required which promotes filtering capacity through a valve device which adjusts oil pressure in multiple stages so that the flowing may properly cope with the strength of oil pressure over time.

As it is possible to prevent a loss of energy caused by resistance and to remove a source of air bubbles caused by the dispersion of oil pressure, the oil flow is stabilizable.

The oil filter heretofore in use is constructed so that the pollutants caught by sudden opening/closing of by-pass valves due to its resistance may get mixed in and return to the side of an engine. In the present invention, if the engine idles or makes a sudden start when two motions operate by linkage, the slide valve 32 begins to operate against high oil pressure together with movement of the amount of filtered oil by opening the slide valves 45a, 45b completely (this is the first stage filtering sector). This operation enables a flow having the Soliton wave effect to continue by maintaining alternating pulses and pulsation in the secondary by-pass means at all times without absorbing energy of wave motions in the primary by-pass means immediately before pulsation of oil flow is weakened without spreading.

Oil circulation in the oil filter is effected by the interactions of cause and effect between pressure applied by resistance and the speed of flowing oil and by the driving conditions. The interference convection of a turbulent flow not only contributes to the production of air bubbles in various forms but also incurs a loss of pressure and terminates a filtering function, thereby impeding securing the necessary amount of oil.

The reason that the depth method is now put to practical use as a full flow oil filter is that resistance of oil passing through the depth filter is weakened and that structure is reformed by mechanical functions.

An oil chamber suitable to the orifice theory of the filter 10 is made and differential pressure of slide valves 45a, 45b is contracted to uniform pressure within the shortest possible time for immediate sliding.

The slide valves 45a, 45b are opened by being divided into two parts at the external pressure and balanced by the load of springs 46a, 46b at both ends. These slide valves slide due to imbalance between the resistance area of oil intake 19 and that of the primary by-pass hole 44. Pressure is thereby applied to the pilot hole (not shown) in a damper 53 for immediate operation of the damper 53.

A form like a venturi is made to quicken the speed of flowing oil in regard to dynamic pressure produced by the opening/closing of slide valves 45a, 45b. The force pressure from the main orifice 5 loses balance by coming into collision with circular grooves which become deceleration resistance surfaces in the interior of inner case 12 where the slide valves 45a, 45b are installed and the slide valves 45a, 45b make a backward movement by being pressed by oil pressure resistance.

At this time, the speed of flowing oil slows down and, at the same time, keeps pulsation of the flowing as it is (oil is made to flow more plentifully than actually and to circulate at a high speed), so that the slide valve 32 at the upper end begins to operate by intercepting the early flowing for itself at the same time as the dynamic pressure operates slide valves 45a, 45b.

Thus, the present invention comprises this structure of a double-system of valves which adapt themselves to cope with an elastic compound filtering system by providing a passive step which immediately responds to the changing flow of force pressure from the oil pump due to a change from the low revolution sector suddenly to the high revolution sector in response to the number of revolutions(cycle) at all times by maintaining the pulsation of a reflected pulse at the fixed end in order to obtain the Soliton wave effect which is most proper and does not disperse by controlling the fluctuating waveform of a flow within narrow limits at all times.

FIG. 2 relates to a filter 10 of the present invention. It is equipped with a filtering means 14 between an outer case 11 and an inner case 12. It is equipped with a cap 18 having an oil intake 23, and a base valve having an oil expelling mouth 28 at the upper end.

On the other hand, it is equipped with a by-pass passage 13 which is formed between the inner rim of the filtering means 14 and the outer rim of the inner case 12 and communicates with the oil intake 15. A primary by-pass means comprises of plural primary by-pass holes 44 in a radial manner in the lower part of the inner case 12 and means to open and close the primary by-pass holes 44. A secondary by-pass means comprises plural secondary by-pass holes 13 in a radial manner in the upper part of the inner case 12 and means to open and close the secondary by-pass holes 13.

The primary by-pass means is equipped with a pair of slide valves 45a, 45b which are installed with upper and lower springs 46a, 46b in the inner rim of holes 44 and open and close holes 44 by coming into contact with each other. A filter net 17 accommodates the oil flowing into a by-pass passage 15 in the inner part of the outer case 11 which is opposed to the primary by-pass holes 44. Springs 46a, 46b are made of memory alloy and their elasticity is variable according to the temperature of the oil.

The secondary by-pass means includes a slide valve 32 which opens and closes the upper by-pass opening 13 by means of oil which flows into by-pass openings 13, 44 bored in the upper and lower parts of the base valve 16.

At the lower end of the base valve 16 there is installed a damper 53 which rectifies the flow of oil flowing in through the primary by-pass holes 44 and the main orifice 5 located at the lower end of the filtering means 14. The damper 53 is equipped with the axis of revolution 54 and a pilot hole (not shown). A power generation means which obtains rotary power according to the flow of oil is installed in the inside of the inner case 12.

The power generation means includes a propeller 43 between the primary by-pass means 44 and base valve, and a driving shaft 42 which is connected to the lower end of the propeller 43, and rotatably supported at the lower end of the outer case 11 and draws its lower end out of the outer case 11.

The filtering means 14 is formed of filter paper 14b wound like a roll with large and small holes 14a made therein. 17 and 9 are filter nets installed in the upper and lower parts of the filtering means 14. 36 is the orifice hole of a slide valve 32. 34 is a spring which lifts and puts down the slide valve 32.

The working of a filter embodied according to the present invention will now be described.

When an automobile is driven in the early stage (or idles), oil flows into the inside of the filter 10 through an oil intake 23 and, by hammer pressure, it flows into the primary by-pass holes 44 of the primary by-pass means along the by-pass passage 15. At this time, some of oil is absorbed in the filter net 17. At the same time, it opens the upper and lower slide valves 45a, 45b and flows into the inside of the inner case 12. The oil which flows in goes out of the filter 10 via the upper oil expelling mouth 28. On the other hand, the oil which flows along the by-pass passage 15 also flows out to the secondary by-pass holes 13 of the secondary by-pass means. At this time, the spring 34 is compressed by oil pressure. At the same time, the slide valve 32 is opened and oil flows into the base valve 16 and then goes out of the filter 10 through the oil expelling mouth 28.

When the automobile reduces the speed to low-speed revolutions from high-speed engine revolutions, hammer pressure is lowered and oil flows to the filtering means 14 for filtration and then goes into the inner case 12 along the main orifice 5. The oil which flowed into the inner case 12 goes out of the filter 10 through the oil expelling mouth 28. At this time, some of oil opens the slide valve 32 of the secondary by-pass means and goes out of the oil expelling mouth 28 through the by-pass passage holes 13 without going through the filtering means 14.

When the automobile runs at a high speed, hammer pressure is lowered and oil flows to the filtering means 14 for filtration. Then it flows into the inner case 12 through the main orifice 5. The oil which flowed into the inner case 12 goes out of the filter 10 through the oil expelling mouth 28.

Meanwhile, the propeller 43 is driven and the driving axis 42 of the power generation means turns around when oil passes through the inner case 12. Revolution of this driving axis 42 can be applied to the revolution of various parts of an automobile by using a flexible wire.

FIG. 1 is a distribution diagram of the present invention.

It comprises a sensor means 70 which detects the temperature, air bubbles and pressure of oil expelled from a pump 100 and the number of revolutions of an engine 110, a microcomputer 80 which inputs the data of the sensor means 70, the dynamic rising pressure and falling-type stop pressure of oil and the amount of oil available at that time, an actuator means 90 which installs plural solenoid valves 91, 91', 91" and is equipped with plural relays 92, 92', 92" which open/close the solenoid valves 91, 91', 91" according to the output from the microcomputer 80, and plural filters 10, 10', 10" arranged so as to deal with the solenoid valves 91, 91', 91".

The sensor means 70 is equipped with a speed sensor 71 which senses the number of revolutions of the engine 110, a temperature sensor 72 which senses the air bubbles of oil and a pressure sensor 74 which senses pressure of hammer pressure produced when oil flows. The pressure sensor 74 uses a piezoelectric element which shows the piezoelectric effect of instantaneous pressure perception and inputs pressure to the microcomputer 80 by converting it into electric signals at a high speed. Among those filters mentioned above, let it be supposed that the filter 10 operates when an automobile runs at an initial speed, the filter 10' operates at a medium speed and the filter 10" operates at a high speed.

In the present invention constituted as stated above, the temperature, air bubbles and pressure of oil expelled from the pump 100 are inputted to the microcomputer 80 by the temperature sensor 72, air bubble sensor 73 and pressure sensor 74 of the sensor means 70. The number of revolutions of the engine 110 is inputted to the microcomputer 80 by the speed sensor 71.

On the other hand, the microcomputer 80 integrates the various data, dynamic rising pressure and falling type stop pressure of oil and opens the valve 91 by operating the corresponding relay 92 of the actuator means 90 when the automobile is driven and filters oil.

When the automobile runs at a medium speed, the microcomputer 80 operates the relay 92' and opens the valve 91' to operate the filter 10'. When the automobile runs at a high speed, the microcomputer 80 operates the relay 92" and opens the solenoid valve 91" to operate the filter 10". When the automobile runs at an initial speed, at a medium speed and at a high speed, the filters 10, 10', 10" divide double-speed oil circulation and filtering capacity among them three by separate or simultaneous operation.

The present invention gives consideration to environmental protection departing from the conventional conception aiming at cheapness and consumption. It requires no maintenance and lengthens a life cycle. It is not a disposable product like industrial wastes and waste oil. It is indispensable to environmental protection.

Based on the conception of filter structure equipped with a mechanism synthetically harmonized in three dimensions by restoring the flowing to the Soliton pulsation flow and maintaining its continuation according to the fuzzy theory by a machine, an electronic actuator and hydraulic engineering, the present invention is completely changed from those ready-made filters heretofore in use. It is of practical use with consideration given to environmental protection. It lengthens the life cycle of disposable parts. Technical knowledge is therefore harmonized with the environment to promote environmental protection.

The present invention maintains a long life cycle without producing wastes and the substantial price reduction is economical without producing waste oil. It is now possible to prevent oil combustion and a source from which carbon dioxide, exhaust gas and hydrocarbon (a source of environmental pollutants) are produced.

A short life cycle of the limited small filtering surface area in the conventional filter makes it necessary to amend wholly or partially the Enforcement Ordinances of Korean Standards and Japanese Industrial Standards D1611 and D3904 on oil filters for environmental preservation.

In the concept of filtration in a conventional manner by force pressure, filtered pollutants get structurally mixed in the engine again with oil when the by-pass opens and closes, and oil is thereby polluted again. However, the present invention completely changes such contradictory structure in the existing filter.

The present invention makes it possible to secure oil quantitatively. It is now possible to change the rapid flowing of oil into a quantitative as well as qualitative flow because it is possible to remove or control a major cause for substantial production of air bubbles.

This is proved by the recent advent of Corioli's flow meter which measures a quantitative as well as qualitative flow.

Unlike those ready-made filters, the present invention does not use the method of forcibly separating particles by applying force pressure to the filter net but eliminates air bubbles by means of a filter and its device constructed so as to have a stabilized pulsation flow by maintaining continuous compressed pulses.

To obtain the proper and comfortable amount of operation in driving the engine, the present invention is constructed so as to maintain the wave motions and pulsations of a flow continuously by forming a judgment according to a program. It is a device which, using plural filters, transmits the special fuzzy program (membership factor) of a flow and the operation factor of a Soliton wave motion to the actuator means-by converting them into electric signals through I.C relays under instructions from the control program of the microcomputer, makes a supply system in conformity with operational conditions on all such occasions and controls the flowing proper to a liquid which moves separately from the operation of a filter in the lubricating system with the amount of mechanical operation linked with operation for the supply system by properly grasping it.

It is physically impossible that the Soliton wave effect produces no air bubbles and the flow of a group of air bubbles serves as a means for carrying ultraparticles and pollutants. Therefore, the flow of air bubbles is unable to serve as the means of carrying pollutants. Surface tension of air bubbles has the property of excluding pollutants, so that pollutants are deposited at metal in each lubricating system within the engine, and camshaft and oil fan before reaching the oil filter.

After all, when the conventional filter is considered in terms of the quantum theory, wave motions of particles cannot be formed as the means of carrying particles by producing a group of air bubbles and active energy is lost in spreading wave motions due to a group of air bubbles so that pollutants scatter and adhere to each part of the engine before reaching the oil filter.

On the other hand, the conventional oil filter is not an effective oil filter by reason that the amount of absorption of minute particles is limited due to its small filtering surface area.

However, the present invention is a new type of environmental protection oil filter which controls the production of air bubbles by a blending of oil filter and electronic control device. It establishes the direction of an oil filter in terms of the hydraulic engineering theory for the first time in the world. It is also a semi-permanently usable invention as a highly precise and clean filter which suggests desirable filtration.

What is claimed is:

1. An oil filter comprising:
   an outer casing having an oil inlet and an oil outlet;
   filtering means disposed in said outer casing comprising a sheet member with holes of various sizes therein, wherein said holes are arranged in columns and, within each said column, said holes either progressively increase or decrease in size;
   bypass means between said oil inlet and said oil outlet for selectively allowing a bypass flow of oil to flow from said oil inlet to said oil outlet without flowing through said filtering means; and
   means responsive to a pressure of an intake flow of oil for controlling said bypass means;
   wherein said intake flow of oil, during filtering, is parallel to a filtering surface of said filtering means.

2. A filter as claimed in claim 1 further comprising;
   an inner casing disposed inside said outer casing and inside said filtering means.

3. A filter as claimed in claim 2, wherein said filtering means is wound on said inner casing without pleats.

4. An oil filter as claimed in claim 2,
   wherein said bypass means comprise holes in said inner casing and said means responsive to a pressure of said intake flow of oil comprise a slide valve disposed inside said inner casing.

5. A filter as claimed in claim 4, wherein said bypass means comprise primary and secondary bypass means.

6. A filter as claimed in claim 1, wherein said columns are arranged such that columns having holes of increasing size in a direction parallel to said columns alternate with columns having holes of decreasing size in said direction.

7. An oil filter comprising:
   an outer casing having an oil inlet and an oil outlet;
   an inner casing inside said outer casing;
   filtering means disposed on said inner casing;
   bypass means between said oil inlet and said oil outlet for selectively allowing a bypass flow of oil to flow from said oil inlet to said oil outlet without flowing through said filtering means;
   means responsive to a pressure of intake flow of oil for controlling said bypass means; and
   a propeller disposed in said inner casing.

8. An oil filter as claimed in claim 7, further comprising a shaft on which said propeller is disposed wherein an end of said shaft extends outside said outer casing.

* * * * *